(No Model.)
L. ADAMS.
COMBINED LIGHTNING AND WATER CONDUCTOR.
No. 573,750. Patented Dec. 22, 1896.
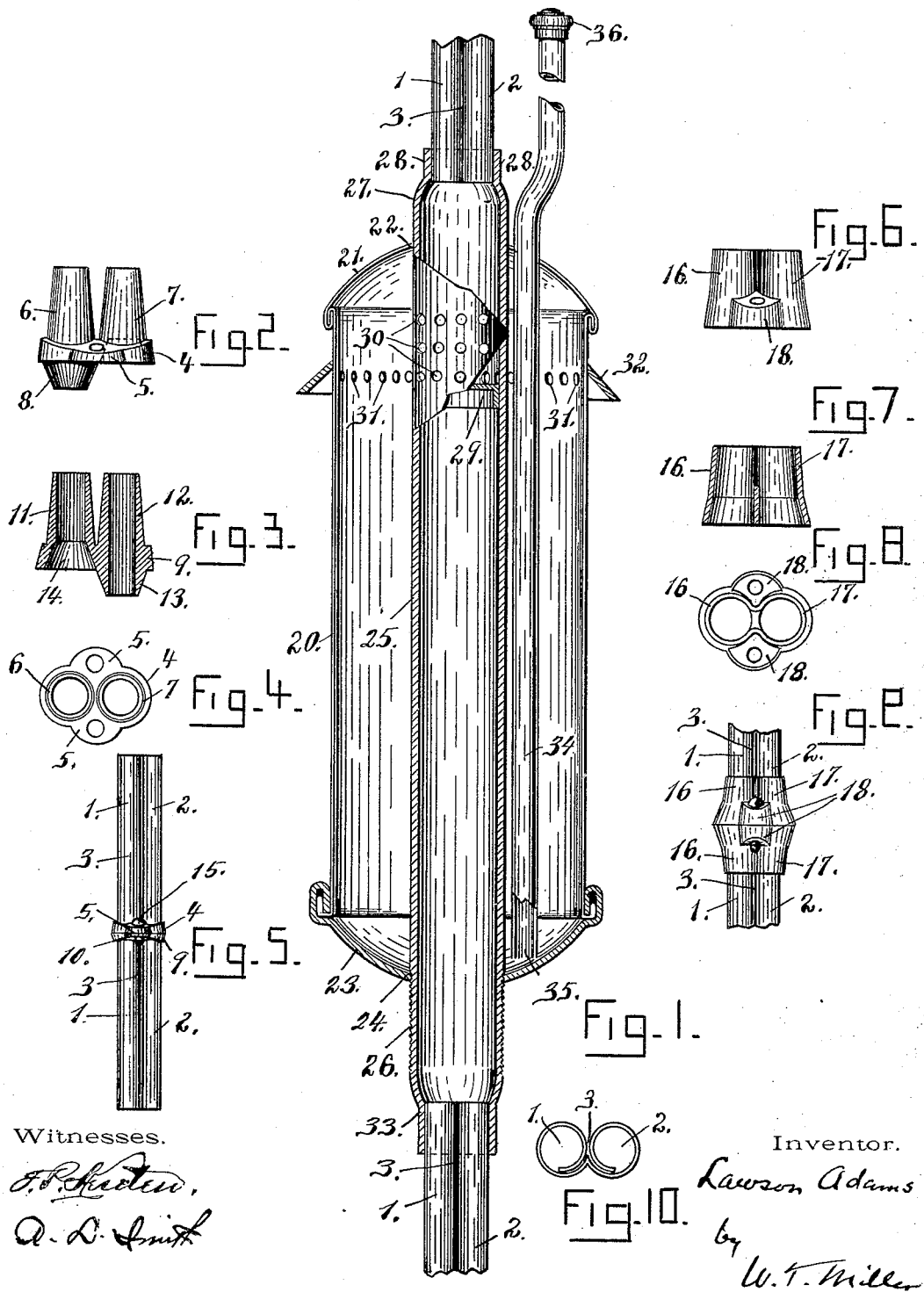
Witnesses.
Inventor.
Lawson Adams
by
W. T. Miller
Attorney.

UNITED STATES PATENT OFFICE.

LAWSON ADAMS, OF BUFFALO, NEW YORK, ASSIGNOR OF ONE-HALF TO ANTON REITH, OF SAME PLACE.

COMBINED LIGHTNING AND WATER CONDUCTOR.

SPECIFICATION forming part of Letters Patent No. 573,750, dated December 22, 1896.

Application filed September 30, 1896. Serial No. 607,416. (No model.)

*To all whom it may concern:*

Be it known that I, LAWSON ADAMS, a citizen of the United States, residing at Buffalo, in the county of Erie and State of New York, have invented certain new and useful Improvements in a Combined Lightning and Water Conductor; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in electric conductors, and more particularly to that form of lightning and water conductors combined for which Letters Patent Nos. 193,469 and 213,367 were granted to me July 24, 1877, and March 18, 1879, respectively. The form of lightning and water conductor covered by both of my above-named patents consisted of a copper plate rolled in double curves forming two connected adjacent pipes, both open on one side for the reception of water, thus forming a combined conductor of electricity and water.

In my 1879 patent a buried reservoir was employed in connection with the double pipes for receiving the water therefrom. These pipes passed vertically through the reservoir and were provided with outlet-apertures within the reservoir, through which the reservoir was filled with the water flowing down the pipes, the reservoir being provided with outlet-orifices through which the surplus water flowed into the earth surrounding such buried reservoir.

The object of my present invention is to improve the above-outlined construction; and to that end it consists, first, in an improved joint for uniting the sections forming the combined lightning and water conductor, and, second, in certain improvements in the reservoir and in the manner of combining it with the lightning and water conductor.

I will now minutely describe the manner in which I have carried out my invention and then claim what I believe to be novel.

In the drawings, Figure 1 is a central vertical section of the reservoir. Fig. 2 is a side elevation of one of the sections of the joint. Fig. 3 is a central vertical section of the opposite section of the joint. Fig. 4 is a top plan view of Fig. 2. Fig. 5 is a side elevation of the completed joint. Fig. 6 is a side elevation of one of the sections of a modified form of joint. Fig. 7 is a central vertical section of Fig. 6. Fig. 8 is a top plan view of Fig. 6. Fig. 9 is a side elevation of the complete modified joint, and Fig. 10 is a cross-section of the combined lightning and water conductor.

Referring to the drawings, 1 and 2 are the two connected adjacent pipes formed from one sheet of copper and open on one side, as at 3, as clearly shown in cross-section in Fig. 10, thus forming a combined lightning and water conductor as covered in my previous patents above named. These are formed in sections of convenient length and joined together to form a continuous conductor. The manner of joining the ends of these sections forms one of the features of my present invention.

In Figs. 2, 3, 4, and 5 is illustrated the joint which I employ. One of the sections of this joint consists of the copper plate 4, having the two side-apertured lugs 5 5. On the upper side of this plate 4 are the two hollow tapering projections 6 and 7, adapted for insertion in the open ends of the pipes 1 and 2 of the conductor, to which they are united, preferably, by brazing. On the opposite or registering surface of the plate 5 is the short hollow tapering projection 8 in line with the projection 6. The other section of the joint consists of the plate 9, having the side-apertured lugs 10, adapted to register with the similar lugs 5 on the plate 4. On one side of the plate 9 are the two hollow tapering projections 11 and 12, adapted for union with the conductor 1 2 in the same manner as just described in connection with the projections 6 and 7 on plate 5. On the opposite or registering surface of the plate 9 is the short hollow tapering projection 13 in line with the projection 12, and 14 is a tapering recess in the plate 9 in line with the projection 11 and adapted for the reception of the projection 8 on plate 5 when the registering surfaces meet for union. A recess in the plate 5 similar to the recess 14 is shown in dotted lines in Fig. 2, adapted for the reception of the projection 13 on plate 9. The two sections of the joint are removably secured together in the construction of the conductor by the bolts 15. The opposite projections 8 and 13 enter and rest within their recesses and assist in making a very rigid joint as they counteract any side strain and relieve the securing-bolts of any damage which might be caused by shearing. Then, too, the sections of the conductor provided with my improved joint can be united quickly and easily, no skill being required in the operation.

The modified form of joint shown in Figs. 6, 7, 8, and 9 have the hollow tapering projections 16 and 17 and the side-apertured lugs 18, and the inside projections 8 and 13 of the plates 4 and 9 in the first form of joint are in this instance omitted from the registering faces of the modified form of joint, the two sections of which are identical in configuration and the pipes 1 and 2 of the conductor are inserted within the hollow projections 16 and 7 and are there brazed to the sections, instead of on the outside, as in the first form of joint. The sections of either form of joint just described can be drop-forged from copper at small expense and make a compact, economical, and easily-manipulated joint for the purpose required.

20 is the copper cylindrical reservoir, having the dome-shaped cover 21, provided with central orifice 22, and 23 is the concave bottom having the central screw-threaded orifice 24.

25 is a copper cylindrical tube having the lower screw-threaded portion 26, adapted for engagement with the screw-threaded orifice 24 in the bottom 23 to form a tight joint after the tube has been slipped down through the orifice 22 in the cover 21. The upper projecting end 27 is crimped on opposite sides to form the two similar seats 28 28 for the reception of the lower end of the conductor 1 2. The parts being brazed together in this position, a plug 29 is secured in the tube 25 near its upper end to prevent the further downward passage of the water from the conductor, and a series of apertures 30 in the tube 25 above the plug 29 and within the reservoir permit of the discharge of the descending water from the tube into the reservoir.

31 is a series of apertures in the wall of the reservoir adjacent to the apertures 30 in the tube. These apertures 31 permit the overflow of water to pass out of the reservoir and moisten the earth surrounding the same. An annular hood 32 is secured around the wall of the reservoir above the apertures to prevent the entrance of dirt through these apertures to the interior of the reservoir. The lower end 33 of the tube 25 may be crimped similarly to the upper end to adapt it for the reception of a section of the conductor 1 2, where it is necessary to employ a supplementary reservoir below the first one, as in the case of an unusually deep sandy soil, where the moisture is too quickly absorbed. A smaller tube 34 is passed down vertically through the cover 21 and extends to the bottom of the reservoir. Its lower end 35 is open and its upper end extends up to a point above the surface of the ground and is provided with a removable cap 36. The function of this tube 34 is to ascertain by its means the height of water in the reservoir or the absence of the same, which is accomplished by the insertion of a dry wire through the tube from its open top to the bottom of the reservoir. The adhering moisture when it is drawn out will accurately indicate the height of water in the reservoir. This tube may also be employed to fill the reservoir during dry weather as a precautionary measure.

I claim—

1. A joint for uniting two sections of the connected adjacent pipes, both open on one side and forming a combined lightning and water conductor, such joint consisting of twin apertured plates having registering surfaces and provided with side-apertured lugs for securing the plates together at the registering surfaces, the sides of the plates opposite the registering surfaces being provided with hollow tapering extensions adapted for union with the ends of the combined lightning and water conductor sections.

2. A joint for uniting two sections of the connected adjacent pipes, both open on one side and forming a combined lightning and water conductor, such joint consisting of twin apertured plates, having registering surfaces, each provided with a hollow projection extending into a similarly-shaped recess in the opposite registering surface and side-apertured lugs upon the plates for securing them together at the registering surfaces, the sides of the plates opposite the registering surface being provided with hollow tapering extensions adapted for union with the ends of the combined lightning and water conductor sections.

3. The reservoir for use in connection with the combined lightning and water conductor shown and described, consisting of a cylinder having central openings in its top and bottom, the opening in the bottom being screw-threaded a tube longer than the reservoir and screw-threaded at its lower end adapted for insertion through the opening in the top of the cylinder and for screw-threaded engagement with the opening in the bottom of the cylinder, the tube being plugged near its upper end and having outlet-orifices above the plug and within the cylinder, and a series of outlet-orifices in the side wall of the cylinder adjacent to the orifices in the tube, the projecting ends of which are adapted for union with the combined lightning and water conductor.

4. The reservoir for use in connection with the combined lightning and water conductor shown and described consisting of a cylinder having central openings in its top and bottom, the opening in the bottom being screw-threaded, a tube longer than the reservoir and screw-threaded at its lower end, adapted for insertion through the opening in the top of the cylinder and for screw-threaded engagement with the opening in the bottom of the cylinder, the tube being plugged near its upper end and having outlet-orifices above the plug and within the cylinder, a series of outlet-orifices in the side wall of the cylinder adjacent to the orifices in the tube, the projecting ends of which are adapted for union with the combined lightning and water conductor and an auxiliary tube with open lower end and removable cap or hood upon its upper end, such tube extending from a point above the surface of the ground and vertically through the reservoir to or adjacent to the bottom thereof for gaging the depth of water therein or artificially filling the same.

In testimony whereof I have signed my name to this specification in the presence of two subscribing witnesses.

LAWSON ADAMS.

Witnesses:
   W. T. MILLER,
   ARTHUR L. SMITH.